United States Patent [19]

Sellmeyer

[11] 4,421,214

[45] Dec. 20, 1983

[54] SYSTEM FOR AUTOMATICALLY RELEASING PARKING BRAKES

[75] Inventor: Daniel J. Sellmeyer, Royal Oak, Mich.

[73] Assignee: Gulf & Western Industries, Inc., Southfield, Mich.

[21] Appl. No.: 216,945

[22] Filed: Dec. 16, 1980

[51] Int. Cl.³ ............................................. B60K 41/26
[52] U.S. Cl. ..................................... 192/4 A; 74/529; 74/540
[58] Field of Search ................. 192/4 A, 4 C; 74/529, 74/540

[56] References Cited

U.S. PATENT DOCUMENTS

| | | | |
|---|---|---|---|
| 2,550,403 | 4/1951 | Carmichael | 192/4 A |
| 2,725,131 | 11/1955 | Martin | 192/4 A |
| 2,781,117 | 2/1957 | McLeod | 74/529 |
| 3,034,374 | 5/1962 | Hinsey | 74/534 |
| 3,079,809 | 3/1963 | Fender | 74/542 |
| 3,135,133 | 6/1964 | Fender | 74/541 |
| 3,184,992 | 5/1965 | Hinsey | 74/534 |
| 3,188,883 | 6/1965 | Fender | 74/534 |
| 3,236,120 | 2/1966 | Fender | 74/531 |
| 3,236,121 | 2/1966 | Gdowik et al. | 74/531 |
| 3,255,852 | 6/1966 | Martin et al. | 192/4 A |
| 3,273,418 | 9/1966 | Ellis | 74/529 X |
| 3,315,538 | 4/1967 | Fender | 74/531 |
| 3,333,512 | 8/1967 | Parsons | 92/140 |
| 3,358,797 | 12/1967 | Walton | 192/4 A |
| 3,364,784 | 1/1968 | Mellen | 74/529 X |
| 3,367,208 | 2/1968 | Fender | 74/531 |
| 3,587,342 | 6/1971 | Yamazaki | 74/540 |
| 4,270,406 | 6/1981 | Lipshield et al. | 74/529 X |

Primary Examiner—Rodney H. Bonck
Attorney, Agent, or Firm—Body, Vickers & Daniels

[57] ABSTRACT

In a somewhat standard system for releasing a parking brake of a wheeled motor vehicle of the type including a mechanical locking panel which coacts with a toothed sector for holding the parking brakes in the set condition, there is provided an improvement for automatically releasing the pawl from the sector when the transmission control mechanism of the vehicle is shifted from park or neutral into a driving condition. The improved device includes an elongated flexible element, such as a cable, extending from the brake releasing mechanism to the transmission control mechanism and a bell crank at the transmission control mechanism which coacts with a movable cam sector to effect the automatic release by pulling the flexible element.

4 Claims, 5 Drawing Figures

(ON)

a<1.5b (OFF)

SYSTEM FOR AUTOMATICALLY RELEASING PARKING BRAKES

The invention relates to the art of parking or emergency brake controls used on wheeled vehicles, such as automobiles, and more particularly to an improved system for automatically releasing the parking or emergency brakes.

BACKGROUND OF INVENTION

Motor vehicles, such as automobiles and smaller trucks, are provided with a parking brake control which is used to set the brakes of the vehicle at certain times, such as when the vehicle is parked. These parking or emergency brake controls generally include a foot pedal which pivots a lever that pulls on a cable for setting the brakes of the vehicle. When the pedal has been depressed, an element on the brake control locks the brakes in the set or activated condition. A variety of mechanisms have been employed for this purpose; however, one of the most common mechanism is a pivoted pawl which engages the arcuately arranged teeth of a gear sector carried by the pedal operated lever. This pawl engages the teeth of the gear sector to hold the brakes in the engaged condition. In this manner, the brakes are set upon depression of the foot pedal by the interaction of the pivoted pawl and gear sector. The parking or emergency brake is released by disengaging the pawl and sector which allows the force being applied by the brake to pull the parking brake control into the released or deactivated condition. The release of the pawl has been accomplished by a variety of mechanisms. The least complex arrangement is a manually operated handle which pulls the pawl from engagement with the gear sector. In this manner, the parking or emergency brake is released by the person operating the vehicle. Although this type of control for the parking and emergency brakes seems to be quite simple, there was one disadvantage realized early in its development. The forces between the gear sector and locking pawl are often quite high; therefore, the manual force necessary to release the parking or emergency brake by disengaging the pawl was often beyond acceptable or convenient levels. For that reason, a substantial amount of work has been devoted to arrangements for disengaging the pawl and gear sector. Such a mechanism is illustrated in U.S. Pat. No. 3,135,133 wherein the gear sector itself is shifted to release the brake locking action. This patent, which is incorporated by reference herein, is an example of one arrangement for manually releasing the parking brakes of a motor vehicle. It illustrates the complexity of rectifying the force induced difficulties experienced by the commonly used pawl and gear sector.

The automotive industry, in keeping with an effort to provide power assist to all manual control functions, demanded a power unit for releasing the parking or emergency brakes of an automobile. The power unit developed was a vacuum operator such as shown generally in U.S. Pat. No. 3,315,538. One difficulty experienced by such vacuum operated release mechanisms was that, in order to create the force necessary to release a pawl from a gear sector, the vacuum unit or motor had to have a substantial size because the only vacuum available was the vacuum created by the manifold system. These large vacuum units or motors were not acceptable. They required too much space and were costly to produce. Thus, there was a trend to smaller vacuum units or motors, as shown in U.S. Pat No. 3,315,538; however, these units required a modified brake locking mechanism. Such a small vacuum unit operated by the vacuum of an internal combustion engine could not operate the normal pawl release. One modified release mechanism includes a pinion gear that rotates with the gear sector. The pinion is locked into position by a surrounding spring. Such a friction locking device can be operated at a lesser force than required in the past for disengaging a pawl from a gear sector.

After having developed a relatively small vacuum motor and a low force friction release device, these mechanisms were used for automatically releasing the brake when the transmission is shifted into a drive condition. This automatic release concept is also disclosed in the aforementioned U.S. Pat. No. 3,315,538. The relatively small vacuum motor was controlled by a valve operated from the transmission control to release the brakes when the transmission control was shifted to the drive or reverse position. Such automatic release mechanisms were quite successful and were used by automobile manufacturers. However, some difficulties were experienced when the brakes were to be released while there was no vacuum. This condition occurred when the engine was not operating. For instance, if an automobile with an automatic brake release was stalled with the brakes applied, the automobile could not be pushed or towed in a conventional fashion. To correct this problem, the automatic brake release mechanisms using fluid motors usually employed manual release levers. These levers were often not easily accessible and were not known generally to persons other than the usual driver.

Even with the problems mentioned above, the automatically released parking brakes using vacuum motors and a friction locking mechanism became somewhat accepted in the trade. Efforts were made to improve the vacuum operated unit or motor for this purpose. A patent relating to such an improvement is U.S. Pat. No. 3,333,512, which patent is also incorporated by reference herein.

To overcome the difficulties experienced with vacuum operated automatic brake release mechanisms, efforts were devoted to convert such release systems to an electrical system wherein a solenoid could be used to disengage the parking or emergency brake. This concept is shown in U.S. Pat. No. 3,358,797. Again, only a relatively small pulling force was available. This patent illustrates the concept of a parking brake being released by a cam movable in unison with a standard transmission control. When the transmission control is in the drive or reverse position, the brakes are automatically released.

THE INVENTION

The present invention relates to an improvement in a parking brake control of the general type discussed above, which improved control employs an automatic release that does not require a low force locking mechanism. The brake control using the invention can be released automatically without needing a low force unit required by using a solenoid or small vacuum motor. Also, this improved mechanism does not have the complexity of prior units which are vacuum or electrically controlled. It can operate on a somewhat standard pawl and gear sector locking mechanism.

In accordance with the present invention there is provided an improvement in a system for releasing parking brakes, as generally discussed above, which improvement includes a device for pulling a flexible element, such as a cable, to release a standard pawl and sector locking mechanism of a parking or emergency brake control. This cable pulling device uses a cam sector moved by the transmission control as the control is shifted. A bell crank pivots about a fixed axis adjacent the transmission control and includes a first end for pulling the release cable and a second end for supporting a follower which engages the cam surface of the cam sector. In this manner, movement of the gear selector of the transmission control from a non-drive condition, such as park or neutral, to a vehicle moving condition, such as reverse or drive, mechanically pulls the release cable. This pivots the lever which disengages the locking pawl. The mechanical advantage of the pivoted lever multiplies the force applied by the cable to the pawl. Thus, the operating lever in the brake control has sufficient mechanical advantage to disengage the pawl from the gear sector to release the brake automatically upon selective movement of the transmission shift lever.

The primary object of the present invention is the provison of an improved system for automatically releasing parking or emergency brakes of a motor vehicle, which improved system can be used with a somewhat standard parking brake operator without substantial modification and which is solely mechanical in operation.

A further object of the present invention is the provision of an improved system of the type described above, which improved system does not require a specialized, low force brake release for use in automatically releasing the parking or emergency brakes of a motor vehicle.

Still a further object of the present invention is the provision of an automatic release system as defined above, which release system does employ the desirable and inexpensive pawl and gear sector brake release mechanism of the general type used through the years in automobiles.

Yet another object of the present invention is the provision of a system as defined above which system is totally mechanical and not subject to the limitations and disadvantages of either a vacuum system or a solenoid system for automatically releasing the brakes in accordance with the position of the shift lever of a transmission control.

These and other objects and advantages will become apparent from the following description.

BRIEF DESCRIPTION OF DRAWINGS

In the specification, the following drawings are employed.

THE INVENTION

Figure 1:
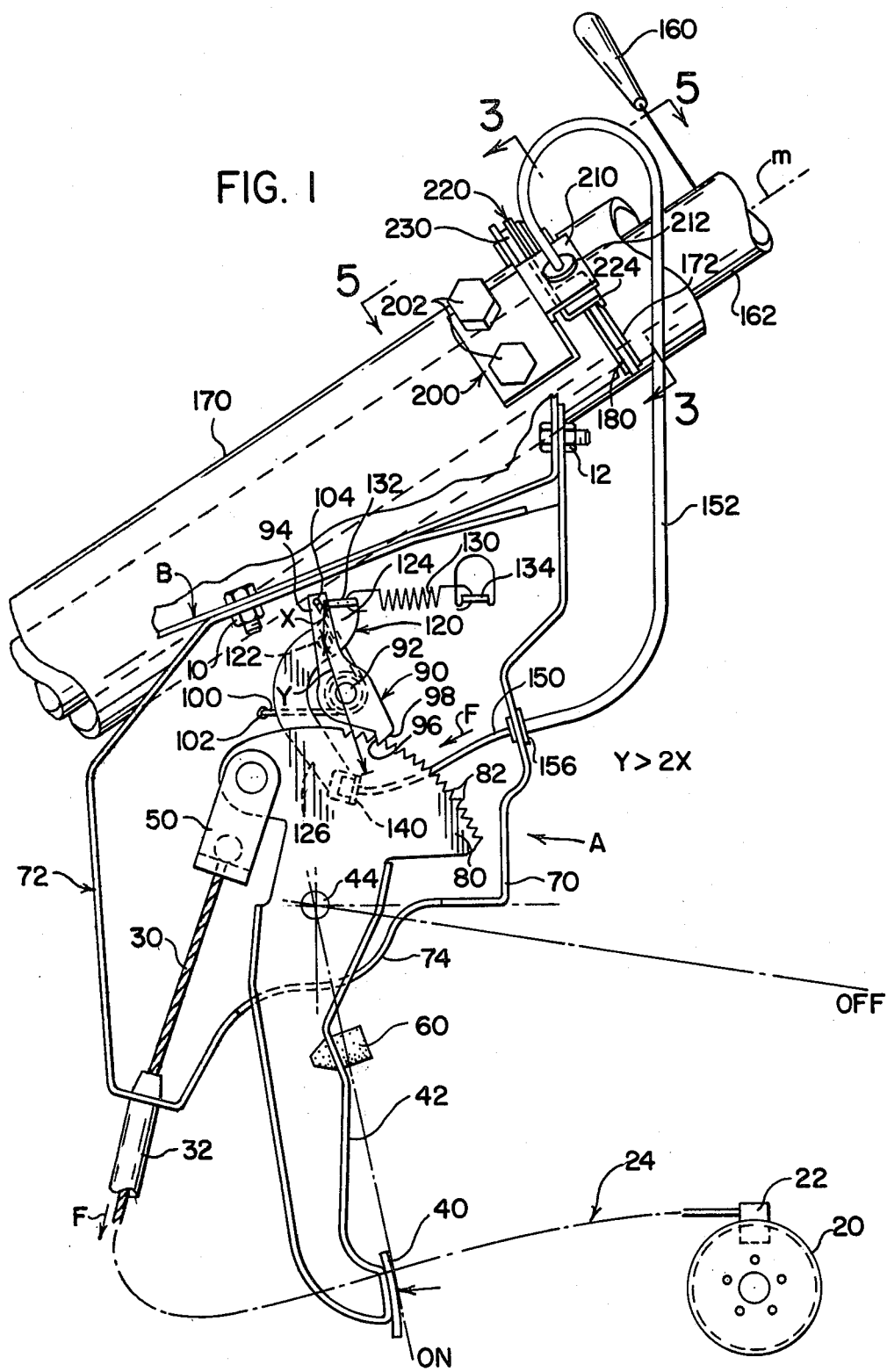
FIG. 1 is an enlarged side elevational view showing, somewhat schematically, the preferred embodiment of the present invention with the parking or emergency brake in the set condition, i. e. with the brakes applied.
Figure 2:
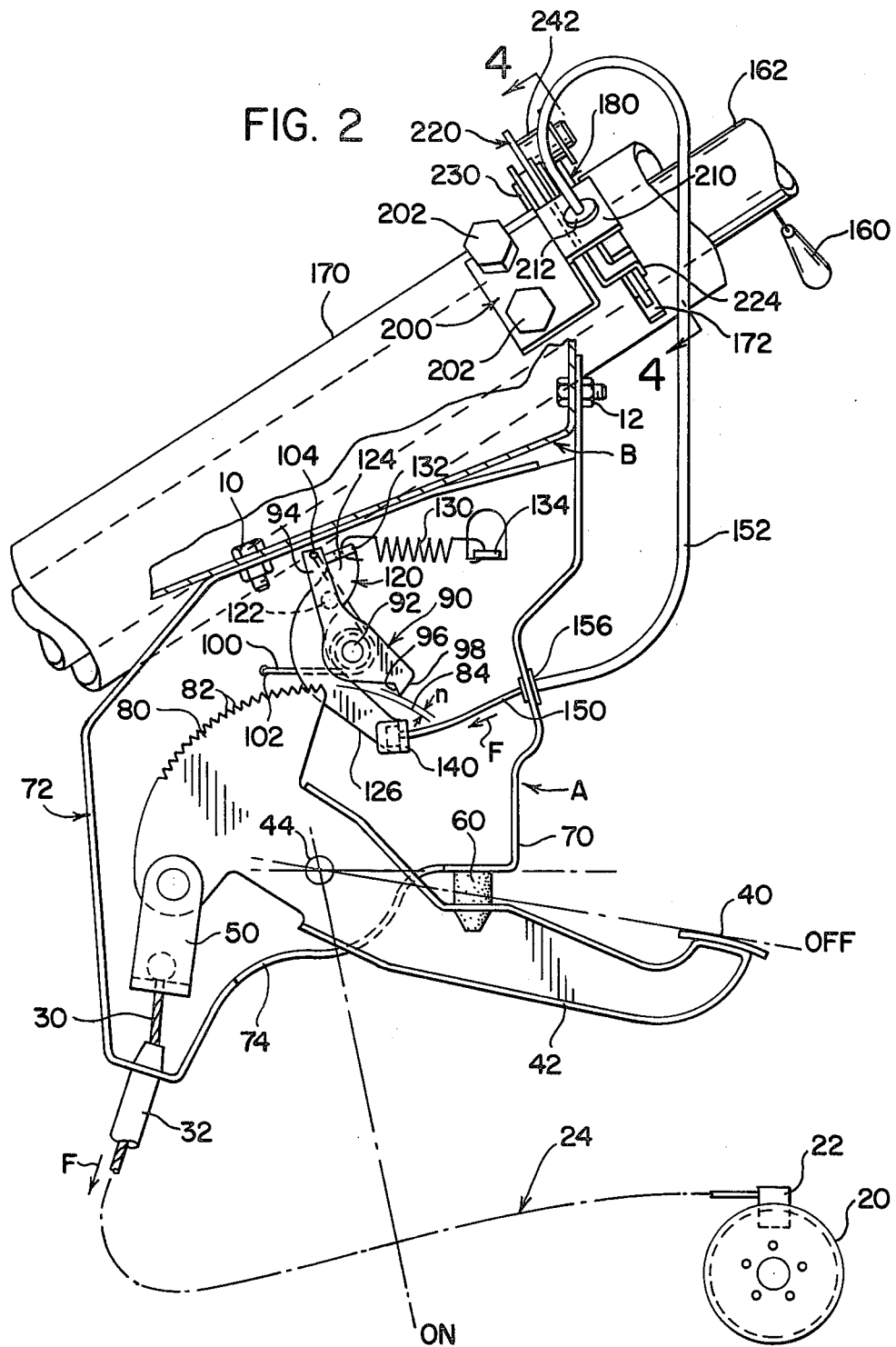
FIG. 2 is a view similar to FIG. 1 showing the invention with the brakes automatically released.

Referring now to the drawings wherein the showings are for the purpose of illustrating a preferred embodiment of the invention only, and not for the purpose of limiting same, FIGS. 1 and 2 show a brake control A secured underneath the cowling B of a motor vehicle by appropriate means, illustrated as bolts 10, 12. In accordance with standard practice, brake control or control device A is adapted to apply brakes, schematically illustrated as brakes 20, through an appropriate arrangement illustrated as a brake actuator mechanism 22. Bowden cable 24, having an inner cable 30 and a sheath 32, is employed for connecting brake actuator mechanism 22 with control A in accordance with standard practice. Of course, the brakes and actuator mechanism are schematically shown for illustrative purposes. Various other braking arrangements could be used whereby the upward pulling of cable 30, into the position shown in FIG. 1, applies the emergency or parking brakes of a motor vehicle. In FIG. 2, the brake is illustrated in its released position with cable 30 pulled downwardly by the normal biasing action in mechanism 22. A pedal 40 connected to the lower end of lever 42, which is pivoted about pin 44, is depressed by the driver to set the brakes, as shown in FIG. 1. A standard clevis 50 connects lever 42 with cable 30 so that the cable may be pulled upwardly by downward movement of pedal 40. Bumper 60 limits the upward pivotal movement of lever 42 as the bumper engages a wall 70 extending perpendicular to the plane of FIGS. 1 and 2. This wall extends also around the periphery of a fixed support housing 72 forming the main support structure of brake control A. Lever 42 extends downwardly from control A through an appropriate opening, such as opening 74, shown in FIGS. 1 and 2. During normal operation, the brakes are released as shown in FIG. 2. To set the brakes, lever 42 is pivoted by pedal 40. This pulls cable 30, as shown in FIG. 1, and sets emergency brakes 20.

To lock the brakes in the set position, as shown in FIG. 1, a pawl and gear sector type of mechanical locking mechanism is employed. This mechanism includes a tooth sector 80 or lever 42 having teeth 82 extending in an arcuate path concentric with the axis of pin 44 and having an outwardly extending height defining an arc 84, best shown in FIG. 2. Spaced teeth 82 move in an arcuate path as pedal 40 is depressed from the position shown in FIG. 2 to the position shown in FIG. 1. A pivoted locking pawl 90 is mounted on journal pin 92 and has an upwardly extending operator arm 94 and a downwardly depending nose 96 with a stop or abutment side 98. Torsion spring 100, having an end 102 secured to housing 72 and an end 104 secured to arm 94, biases pawl 90 in the clockwise direction, as shown in FIGS. 1 and 2, so that nose 96 extends into a recess between adjacent teeth 82. By the geometry of nose 96, the left end of the nose cams over the individual teeth as the brakes are applied by lever 42. After sufficient force is exerted to set the brakes as shown in FIG. 1, pressure on lever 42 is released. Stop 98 prevents the next tooth from moving against the force in cable 30. Thus, lever 42 is locked in place by the interaction between abutment or stop 98 and one of the teeth 82. The brakes remain in this set condition until released by counterclockwise movement of pawl 90 against the biasing action of torsion spring 100.

To snap the pawl from engagement from one of the teeth 82, a high ratio release lever 120 is employed. This lever is pivotally mounted about a fixed pin 122 and has an upper short arm 124 and a lower longer arm 126. As shown in FIG. 1, the effective length of arm 124 is x and the effective length of arm 126 is y. In practice y is greater than 2.0 x, which ratio indicates that arm 126 has an effective operating length greater than the operating length of arm 124. Preferably the length y of arm 126 is at least three times the length x of arm 124. In this manner, a substantial mechanical advantage is created as lever 120 is pivoted about pin 122 by lower arm 126. Tension spring 130, connected to tab 132 of arm 124 and tab 134 of fixed support housing 72, biases lever 120 in the clockwise direction. Tab 132 is formed at a right angle to FIGS. 1 and 2 and engages arm 94 of pawl 90. At the end of arm 126 there is provided a cable connector 140 secured to a cable 150 of a standard Bowden type cable having a sheath 152. Cable connector 156 connects Bowden cable sheath 152 onto wall 70. Spring 130 applies a continuous biasing force to lever 120. This exerts a force F on cable 150 which tends to pull the cable 150 into the position shown in FIG. 1 to allow pawl 190 to lock lever 42 in the brake setting position. To release the brakes, cable 150 is pulled to the right. The axial or linear movement acts against lever 120 through arm 126. This pivots lever 120 about pin 122 so that tab 132 engages and forces arm 94 to the left, as shown in FIGS. 1 and 2. The resulting released position is shown in FIG. 2. Nose 96 of pawl 90 is moved a distance n from the outer arcuate path 84 of teeth 82. In this manner, stop or abutment 98 disengages sector 80, as shown in FIG. 2. This releases lever 42 so that the force exerted on cable 30 can pull pedal 40 back into the rest position. As so far described, except for the particular structure of lever 120, parking or emergency brake control A operates in accordance with standard practice.

Figure 3:
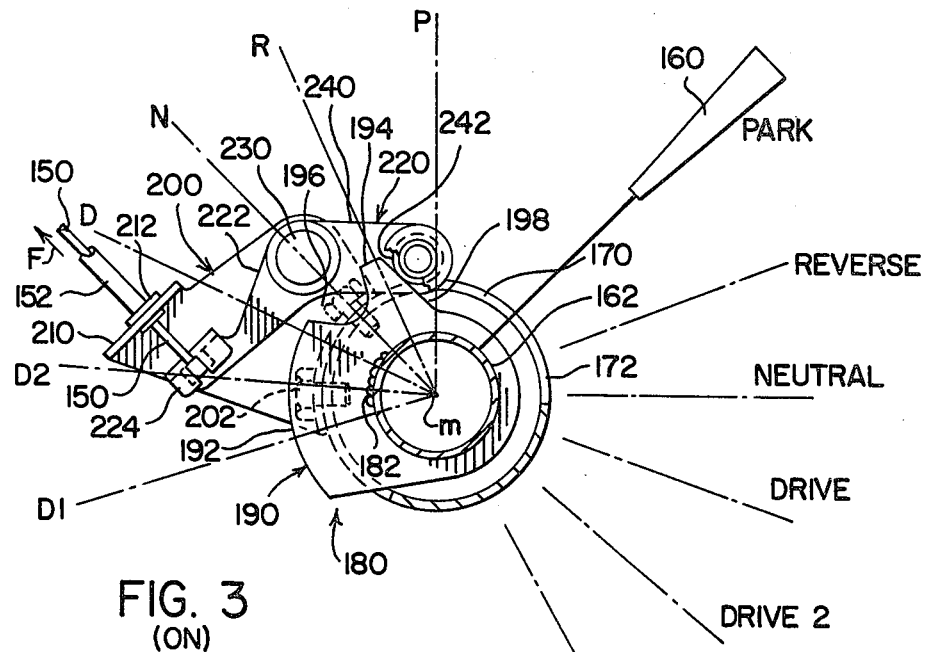
FIG. 3 is a cross-sectional view taken generally along line 3—3 of FIG. 1.
Figure 4:
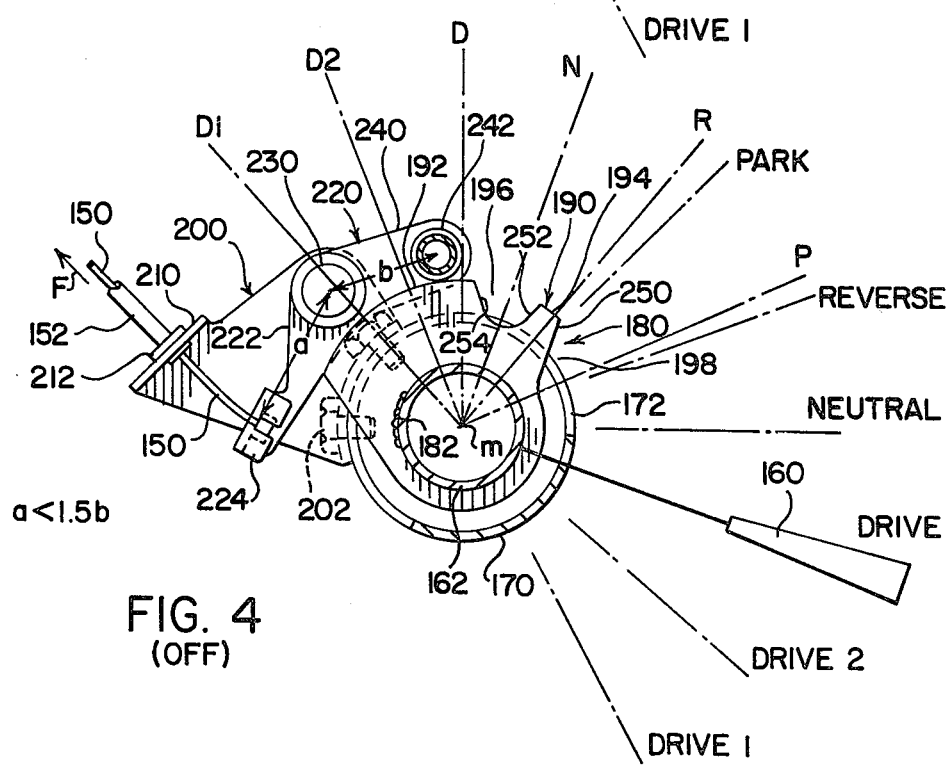
FIG. 4 is a cross-sectional view taken generally along line 4—4 of FIG. 2.
Figure 5:
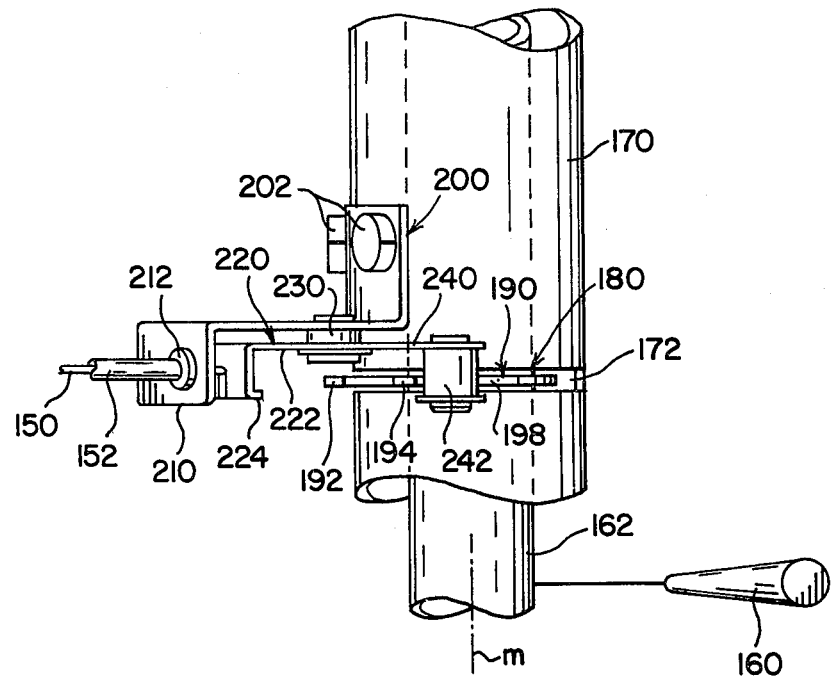
FIG. 5 is a partially cross-sectioned view taken generally along line 5—5 of FIG. 1.

In accordance with the invention, cable 150 is pulled automatically when the transmission control of the vehicle is shifted into the drive or reverse condition. A mechanical connection is provided between the brake release lever 120 and the transmission control mechanism of the vehicle. In accordance with standard practice, a shift lever 160 is secured onto a tube 162 which oscillates about an axis m. Steering column housing 170 has an arcuately extending slot 172 through which extends a cam plate or sector 180 welded at a joint 182 to the inner tube 162. This tube is rotated with shift lever 160. The outwardly facing cam surface 190 of sector 180 has a contour defined by spaced lobes 192, 194. Lobe 192 corresponds to the drive position of lever 160. Lobe 194 corresponds to the reverse position of shift lever 160. Recess 196 between the lobes corresponds to the neutral position of lever 160. In a like manner, a recess or discontinued portion 198 of cam surface 190 corresponds to the park position for lever 160. These relationships are best shown in FIGS. 3 and 4 and can be changed to satisfy the design of the shift control. To support the structure that coacts with plate or sector 180, a fixed bracket 200 is secured by bolts 202 onto housing 170. Tab 210 of bracket 200 is adapted to extend generally parallel to axis m and supports a cable connector 212 which receives the end of sheath 152 of the brake releasing Bowden cable. Lever or bell crank 220, having an arm 222 with a cable connector 224, is pivoted about a pin 230 and includes a second arm 240 having a rotatably mounted cam follower 242. In practice, arm 222 has an effective length a and arm 240 has an effective length b. These two lengths are substantially the same; however, it is desired that length a be less than about 1.5 times length b. By this relationship, the mechanical advantage developed by lever 120 is transmitted to bell crank 220 so that cam plate or sector 180 does not apply a substantial resistance to the normal operation of shift lever 160. Transition portions 250, 252, 254 are profiled to allow for such normal operation commensurate with the need for pivoting bell crank 220.

Referring now more particularly to FIG. 3, follower 242 is in recessed or cut-away portion 198 of cam surface 190. Thus, manual shift lever 160 is in the park position. This geometry allows cable 150 to be in the position shown in FIG. 1. Spring 130 pivots lever 120 into the position releasing pawl 90 for its normal locking function. Thus, the brakes can be applied as shown in FIG. 1. After the brakes have been applied, if shift lever 160 is moved to the reverse position, portion 250 and lobe 194 will pivot bell crank 220 into the position shown in FIG. 4, which shows the cam plate in the drive position. This movement of bell crank 220 will pull cable 150 into the position shown in FIG. 2. This will pivot force magnifying lever 120 to move tab 132 to the left, as shown in FIG. 2. This pops or forces nose 96 from its engaged tooth 82 and allows the force in cable 30 to return the brakes to their disengaged position. Pedal 40 is moved into its normal position, as shown in FIG. 2. The brakes cannot be applied unless follower 242 is in the recess 196 or the recess 198. As shown in FIG. 4, bell crank 220 is pivoted into the brake release position defined by the position of lobe 192 which corresponds to the drive position of shift lever 160. Of course, the other drive positions (Drive 1 and Drive 2) have the same continuous lobe.

As can be seen, a mechanical linkage from the transmission control to the brake release mechanism is combined with a force transmitting lever 120 to allow snapping of the locking pawl from the tooth or gear sector to release the brakes when the shift lever 160 is in any of the positions indicating movement of the vehicle. This action can take place whether or not the motor of the vehicle is operating.

Having thus described the invention, the following is claimed:

1. In a system for releasing the parking brakes of a wheeled vehicle having a transmission control manually shiftable between a non-driving condition and a drive condition, said system including mechanical means for setting the parking brakes in a set condition, mechanical locking pawl means coacting with a toothed sector for retaining the parking brakes in the set condition, a release lever pivoted about an axis between a first inactive position and a second position, means responsive to pivotal movement of said release lever into said second position for releasing said mechanical locking pawl means and allowing the brakes to be released, an elongated flexible element for pivoting said lever from said first position to said second position to release said locking pawl means when said flexible element is pulled in a selected direction, and biasing means pivotally urging said lever into said first inactive position and also urging said flexible element in a direction opposite to said selected direction, the improvement comprising: a device for automatically pulling said flexible element in said selected direction when said transmission control is shifted into a drive condition, said automatic device comprising: a cam sector with a generally arcuate cam surface and pivoted about a given axis generally at the center of said arcuate cam surface as said transmission control is manually shifted between a park, reverse, neutral and drive position, a fixed bracket adjacent said pivotable cam sector, a bell crank pivoted on said bracket about a second axis generally parallel to said given axis and having first and second ends, means for connecting said fist end onto said flexible pulling element whereby said element is pulled by said bell crank as said bell crank is pivoted in a first direction, and a cam follower on said second end and riding along and biased against said arcuate cam surface, by said biasing means urging said flexible element in said opposite direction, to position the said lever in and predetermine the said first inactive position thereof; said arcuate cam surface having first and second lobe portions; said first lobe portion for forcing said follower in a direction pivoting said bell crank in said first direction, when said transmission control is in said drive position, to cause the said flexible element to pivot the said release lever to the said second position thereof so as to effect the release of the said locking pawl means and the parking brakes, and said second lobe portion for forcing said follower likewise in a direction pivoting said bell crank in said first direction, when said transmission control is in said reverse position, to similarly effect the release of the said locking pawl means and the parking brakes.

2. The improvement as defined in claim 1 wherein said first end of said bell crank has a lever arm a and said second end has a lever arm b and wherein a is less than about one and one-half b.

3. The improvement as defined in claim 2 wherein said release lever has a mechanical advantage of at least 2:1.

4. The improvement as defined in claim 1 wherein said release lever has a mechanical advantage of at least 2:1.

* * * * *

UNITED STATES PATENT AND TRADEMARK OFFICE
CERTIFICATE OF CORRECTION

PATENT NO. : 4,421,214
DATED : December 20, 1983
INVENTOR(S) : Daniel J. Sellmeyer It is certified that error appears in the above–identified patent and that said Letters Patent are hereby corrected as shown below:

On the title page, after "Item [73] Assignee" cancel "Gulf & Western Industries, Inc.," and insert --- Gulf & Western Manufacturing Company ---.

Signed and Sealed this

Third Day of April 1984

[SEAL]

Attest:

GERALD J. MOSSINGHOFF

*Attesting Officer*     *Commissioner of Patents and Trademarks*